US006932369B2

(12) United States Patent
Walsh et al.

(10) Patent No.: US 6,932,369 B2
(45) Date of Patent: Aug. 23, 2005

(54) WHEELCHAIR AND STRUCTURAL ELEMENTS THEREFORE

(75) Inventors: Ian Ashley Walsh, Dudley (GB); Robert Menear, Sutton Coldfield (GB)

(73) Assignee: Sunrise Medical HHG Inc., Longmont, CO (US)

(*) Notice: Subject to any disclaimer, the term of this patent is extended or adjusted under 35 U.S.C. 154(b) by 0 days.

(21) Appl. No.: 10/681,707

(22) Filed: Oct. 8, 2003

(65) Prior Publication Data

US 2004/0070164 A1 Apr. 15, 2004

Related U.S. Application Data

(63) Continuation of application No. PCT/GB02/03633, filed on Aug. 8, 2002.

(30) Foreign Application Priority Data

Aug. 8, 2001 (GB) .............................................. 019279

(51) Int. Cl.[7] ................................................ B62M 1/14

(52) U.S. Cl. ............................... 280/250.1; 280/281.1; 280/304.1; 280/650; 403/345; 403/383

(58) Field of Search ........................... 280/250.1, 304.1, 280/650, 651, 42, 647, 646, 281.1; 297/DIG. 4; 248/125.7, 125.9, 911; 52/591.3, 591.1, 592.2; 403/345, 373, 383, 335, 356, 378, 379.6, 377

(56) References Cited

U.S. PATENT DOCUMENTS 3,054,643 A 9/1962 Militano
4,006,993 A * 2/1977 Woerlee .................. 403/359.5
4,188,801 A * 2/1980 Hugh et al. ................. 464/106
4,813,693 A * 3/1989 Lockard et al. ............... 280/42
4,900,182 A * 2/1990 Stillwagon .................. 403/325
5,284,350 A 2/1994 Geiger et al.
5,320,374 A * 6/1994 Farris et al. ................ 280/276
5,382,036 A * 1/1995 Counts et al. ........... 280/250.1
5,655,623 A * 8/1997 Skyba ........................ 182/116
5,839,703 A * 11/1998 Tesar ........................... 248/65
5,851,018 A * 12/1998 Curran et al. ............ 280/250.1
6,250,661 B1 * 6/2001 Dickie et al. ............ 280/304.1
6,273,445 B1 * 8/2001 Garven, Jr. .............. 280/304.1
6,394,476 B1 * 5/2002 Molnar .................... 280/250.1
2003/0189317 A1 * 10/2003 Chen et al. ................. 280/650

FOREIGN PATENT DOCUMENTS

DE 9314406 9/1993
EP 1 132 535 9/2001
WO PCT/GB90/01732 11/1990

* cited by examiner

*Primary Examiner*—Anne Marie Boehler
(74) *Attorney, Agent, or Firm*—MacMillan, Sobanski & Todd, LLC

(57) ABSTRACT

An assembly comprises an elongate member and a receiving member. The elongate member has an external cross-sectional shape which is substantially square and has corners replaced by circumferentially spaced circular portions of a circumscribing circle with flat portions therebetween which lie within the circle. The receiving member has a receiving formation having an internal cross-sectional shape which cooperates at least with the flat portions of the external cross-sectional shape of the elongate member to prevent relative movement between the receiving member and elongate member about a longitudinal axis of the elongate member. The assembly is adapted for use in a joining the members of a wheelchair. The invention is further directed towards a structural assembly comprising an elongate member engaging in a receiving formation of a receiving member and a clamp embracing the receiving member to clamp the elongate member in the receiving formation. The clamp includes a locating element cooperating with respective formations in the elongate member and receiving member to position the elongate member in the direction of its length relative to the receiving member. The clamp is adapted for use in a joining the members of a wheelchair.

17 Claims, 9 Drawing Sheets

WHEELCHAIR AND STRUCTURAL ELEMENTS THEREFORE

CROSS REFERENCE TO RELATED APPLICATIONS

This application claims is a continuation of pending International Application No. PCT/GB02/03633 filed Aug. 8, 2002, which claims the benefit of GB patent application No. 0119279.8, filed on Aug. 8, 2001, each of which are incorporated herein by reference.

BACKGROUND OF INVENTION

This invention relates in general to land vehicles and more particularly, to personal mobility vehicles, such as wheelchairs, scooters, and the like. Most particularly, the invention relates to structural elements suitable for use in wheelchairs that are adjustable to accommodate persons of different sizes.

Adjustable wheelchairs are well known. Some wheelchairs are adjustable to accommodate persons of different sizes. A particular requirement for such adjustment arises when a wheelchair is intended to be used for a child, in which case, the size of the wheelchair needs to be increased as the child grows. While it may be impractical for a single size wheelchair to accommodate a range of sizes of users from a small child to an adult, adjustability of the wheelchair enables use of a single wheelchair to be possible for a number of years before another wheelchair has to be used.

As well as being adjustable, wheelchairs have been devised so as to be foldable from an operative condition to a condition in which side frame structures of the wheelchair are disposed more closely together so that the wheelchair occupies less space. This makes it easier to store or transport the wheelchair when it is not occupied.

A conventional side frame structure typically includes an upper rail member and a lower rail member extending forward and rearward of the wheelchair and substantially parallel to one another. A cross-brace assembly has two cross-brace members pivotally connected to one another by a pivot member. Each cross-brace member has a lower end that is pivotally connected to a respective side frame lower rail member and an upper end that is connected to a respective seat-supporting member. Links are pivotally connected between the cross-brace members and respective upper rail members of the side frame structures. To provide the adjustable width of the wheelchair, the cross-brace members and the links are adjustable.

The rail members of a conventional side frame structure are typically in the form of tubular metal, joined at front and rear by spaced upright members, which commonly include plastic moldings. The upright members at the front of the wheelchair generally support front wheels, usually castor wheels, and footrests, leg rests, and/or other devices that are commonly found at the front of wheelchairs. The upright members at the rear of the wheelchair may support rear wheels, seatbacks, attendant handles, and other items commonly found at the rear of wheelchairs. The rail members, which are circular in external cross-sectional shape, engage as a close fit in correspondingly-shaped receiving formations in the upright members, and are held in the receiving formations by fasteners extending transversely from the upright members and diametrically through the rail member parts received therein. The circular external cross-sectional shape of the rail members is, of course, convenient for pivoting of the cross-brace members and the links of the cross-brace assembly thereabout but has a disadvantage in that the connections with the upright members might become slightly less than fully tight and rigid over an extended service life of the wheelchair. In particular, "working" of the fasteners passing through the rail member parts and the plastic moldings which receive the rail member parts might permit the rail members to twist about a longitudinal axis within the receiving formations.

What is needed is a structural assembly wherein relative movement between rail members and upright members of a wheelchair side frame is prevented but a pivotal connection of cross-brace members and links about the rail members can be provided.

SUMMARY OF INVENTION

The present invention is directed towards structural assembly that meets the foregoing needs. The assembly comprises an elongate member and a receiving member. The elongate member has an external cross-sectional shape which is substantially square and has corners replaced by circumferentially spaced circular portions of a circumscribing circle with flat portions therebetween which lie within the circle. The receiving member has a receiving formation having an internal cross-sectional shape which cooperates at least with the flat portions of the external cross-sectional shape of the elongate member to prevent relative movement between the receiving member and elongate member about a longitudinal axis of the elongate member.

The invention is also directed towards a wheelchair comprising two side frame structures which carry wheels. Each side frame structure includes an upper rail member and a lower rail member extending forward and rearward of the wheelchair. At least one structural assembly is provided between one or more of the rail members for joining the rail members at front and/or rear of the wheelchair. The assembly comprises an elongate member and a receiving member. The elongate member has an external cross-sectional shape that is substantially square with its corners replaced by circumferentially spaced circular portions of a circumscribing circle and flat portions therebetween which lie within the circle. The receiving member has a receiving formation having an internal cross-sectional shape which cooperates at least with the flat portions of the external cross-sectional shape of the elongate member to prevent relative movement between the receiving member and elongate member about a longitudinal axis of the elongate member.

The invention is further directed towards a structural assembly comprising an elongate member engaging in a receiving formation of a receiving member and a clamp embracing the receiving member to clamp the elongate member in the receiving formation. The clamp includes a locating element cooperating with respective formations in the elongate member and receiving member to position the elongate member in the direction of its length relative to the receiving member.

The invention is still further directed towards a first cross-brace member pivotally connected to a second cross-brace member. The cross-brace members each comprises an elongate member. At least one of a seat-supporting member or a pivot member comprises a receiving member. The elongate member engages in a receiving formation of the receiving member. A clamp embraces the receiving member to clamp the elongate member in the receiving formation. The clamp includes a locating element cooperating with respective formations in the elongate member and receiving member to position the elongate member in the direction of its length relative to the receiving member.

The invention is also directed toward a wheelchair comprising two side frame structures that carry wheels. Each side frame structure includes an upper rail member and a lower rail member extending forward and rearward of the wheelchair. A cross-brace assembly includes first and second cross-brace members. Each cross-brace member comprises an elongate member and a pivot member pivotally engaged with a respective side frame lower rail member. A seat is supported by a seat-supporting member of each one of the cross-brace members. At least one of the seat-supporting member or the pivot member comprises a receiving member. The elongate member engages in a receiving formation of the receiving member. Links are pivotally connected between the cross-brace members and respective upper rail members of the side frame structures. A clamp embraces the receiving member to clamp the elongate member in the receiving formation. The clamp includes a locating element cooperating with respective formations in the elongate member and receiving member to position the elongate member in the direction of its length relative to the receiving member.

Various objects and advantages of this invention will become apparent to those skilled in the art from the following detailed description of the preferred embodiment, when read in light of the accompanying drawings.

DETAILED DESCRIPTION

Figure 1:
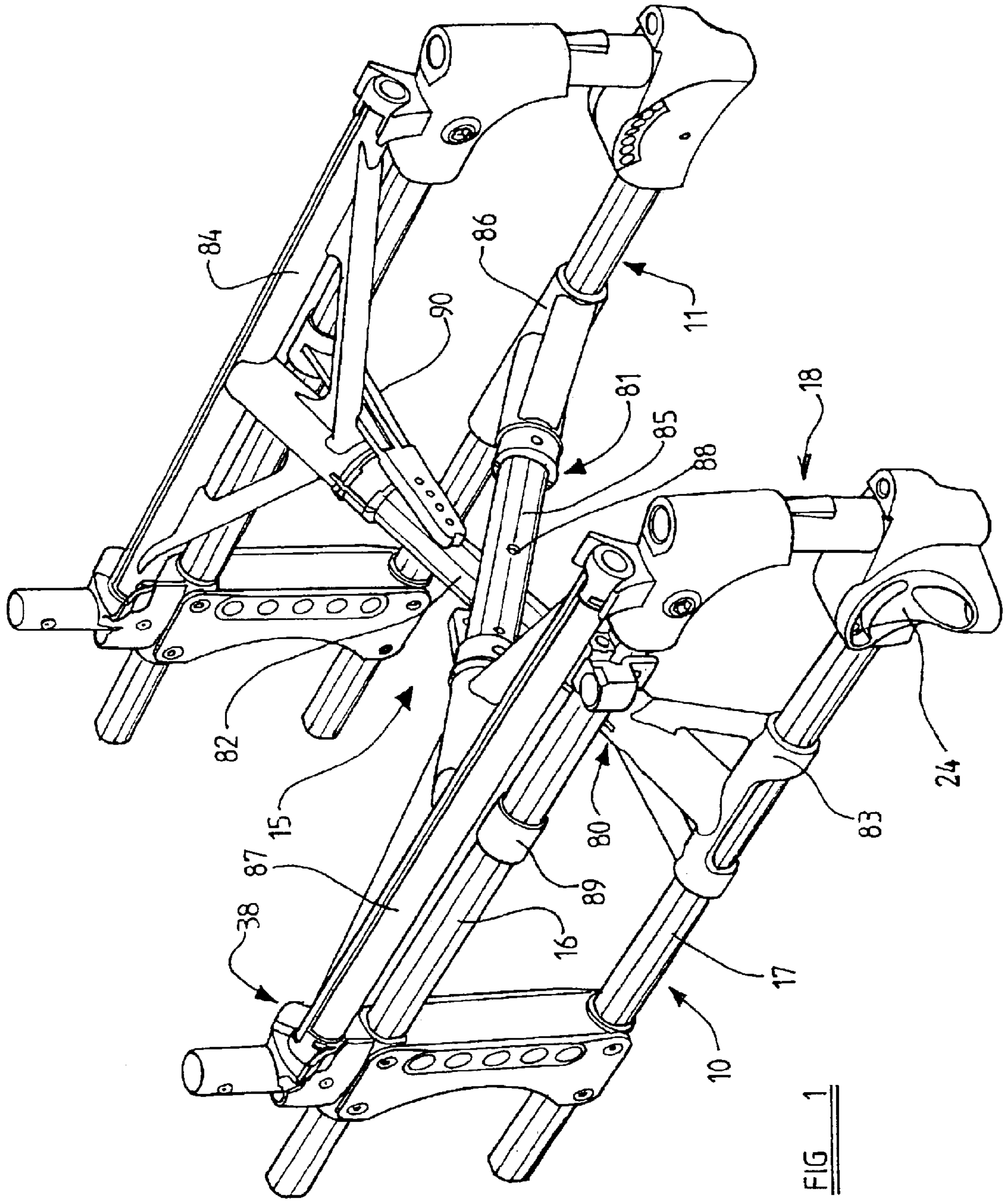
FIG. 1 is a perspective view of part of a wheelchair in accordance with the invention, showing the cross-brace assembly thereof.
Figure 2:
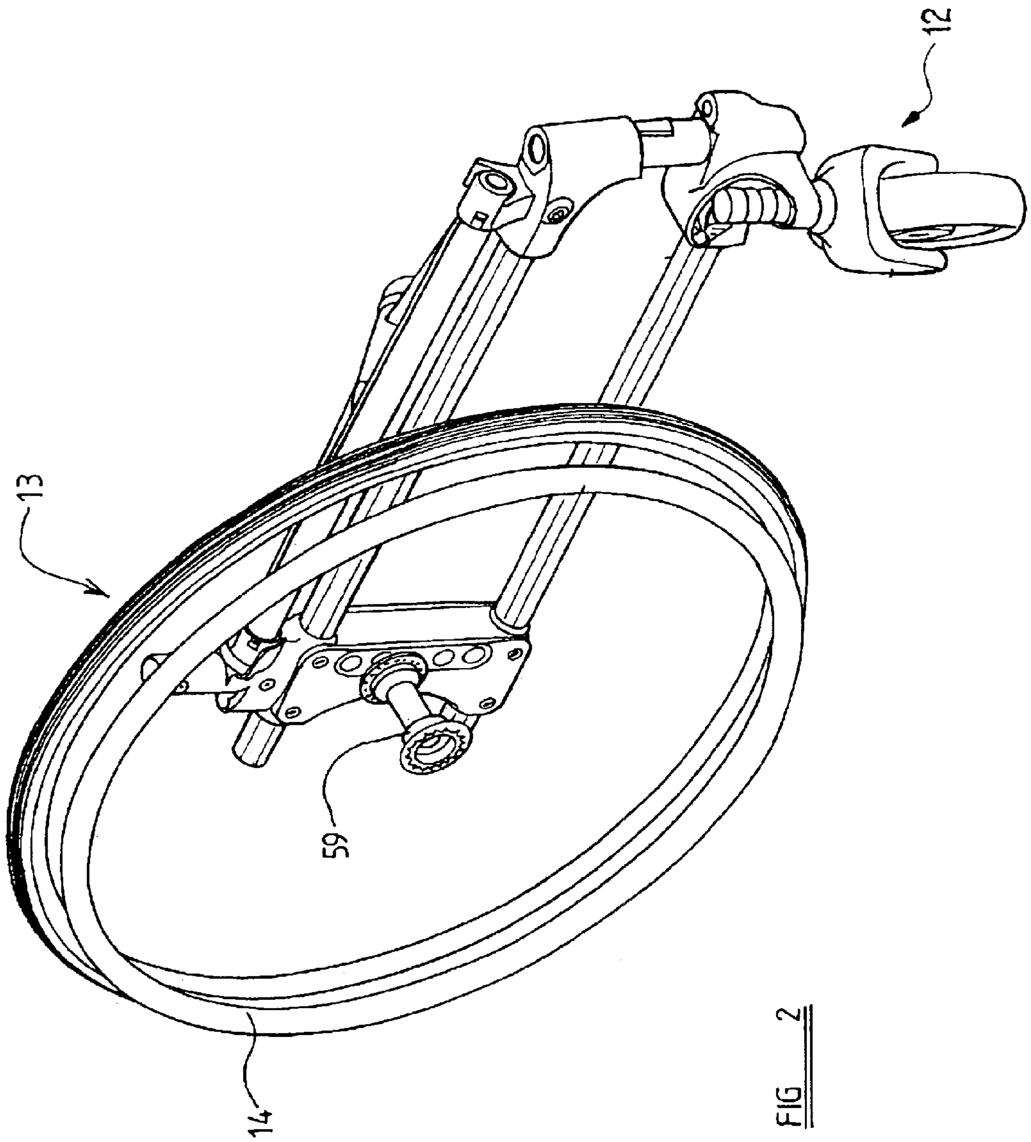
FIG. 2 is a perspective view of one of the side frame structures of the wheelchair, showing the disposition of the wheels thereof.

Referring now to the drawings, there is illustrated in FIGS. 1 and 2 part of a wheelchair comprising two side frame structures, indicated generally at 10, 11, spaced laterally of the wheelchair from one another. Each side frame structure 10, 11 carries one front wheel 12 and one rear wheel 13 of the wheelchair (shown in FIG. 2). The front wheel 12 is a castor wheel and the rear wheel 13 is a large diameter wheel having a driving rim 14 for manual manipulation by an occupant of the wheelchair for propelling the wheelchair. The mounting of the wheels 12, 13 to the relevant parts of the side frame structure will be described in greater detail hereafter. The side frame structures 10, 11 are joined by a cross-brace assembly, indicated generally at 15, and which also will be described in greater detail hereafter.

Figure 3:
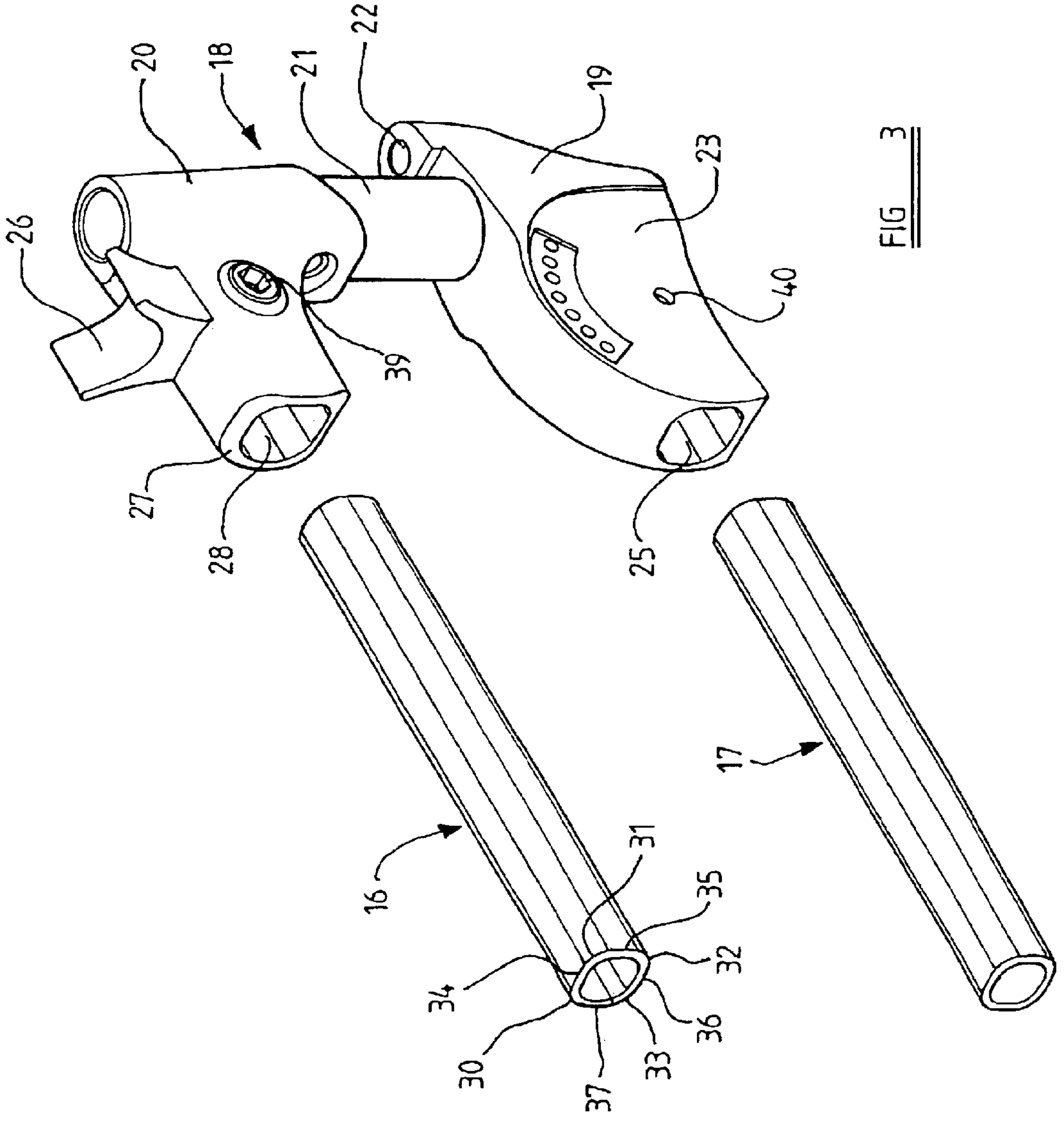
FIG. 3 is an exploded perspective view of part of the side frame structure of FIG. 2.

The side frame structures 10, 11 are mirror images of one another, the structure 10 comprising an upper rail member 16 and a lower rail member 17 extending parallel to one another or substantially so and forward and rearward of the wheelchair. The upper rail member 16 and the lower rail member 17 are joined at the front of the wheelchair by a front upright member 18 and at the rear of the wheelchair by a rear upright member 38. The upright members 18, 38 are preferably moldings of a suitable structural plastic material. As seen in more detail in FIG. 3, the front upright member 18 comprises a lower body portion 19, an upper body portion 20, and an intermediate upwardly extending portion 21 therebetween. The lower body portion 19 has at its front an upwardly facing socket 22 for co-operation with, for example, a footrest (not shown) of the wheelchair and a rearward extending portion 23 for attachment of a bracket 24 for mounting the front wheel 12. A socket 25 opens at the rear of the lower body portion 19 to receive the lower rail member 17.

The upper body portion 20 also extends rearward from the top of intermediate portion 21 and at its upper surface has a saddle formation 26 for supporting one end of a seat-supporting member 84, 87 to be described hereafter. A boss portion 27 extends rearward of the saddle 26 and has a rearward facing socket 28 for reception of upper rail member 16.

The upper and lower rail members 16, 17 are preferably of tubular metal, most preferably an aluminum alloy. The external cross-sectional shape of the rail members 16, 17 is the same as one another, and is preferably non-circular comprising four equally circumferentially spaced arcuate portions 30, 31, 32, 33 joined by four flat portions 34, 35, 36, 37 therebetween which are parts of the sides of a square. The arcuate portions 30 to 33 form respective parts of a circumscribing circle within which the flat portions 34 to 37 lie. The cross-sectional shape can be considered to be a square but with its corners removed and replaced by part circular portions. The tubular rail members 16, 17 preferably have approximately constant wall thickness, and preferably are extrusions.

The sockets 28, 25 in which the upper and lower rail members 16, 17, respectively, fit are preferably of the same internal cross-sectional shape as the external shape of the rail members 16, 17, and receive the rail members 16, 17 as a tight fit. A transverse fastener passing through the rail member 16 and body portion 20 where indicated at 39 holds the top rail member 16, while a transverse fastener 74 (shown in FIG. 6) extending through an aperture 40 in the body portion 19 and a corresponding aperture (not shown) in the lower rail member 17 secures the lower rail member 17.

Figure 4:
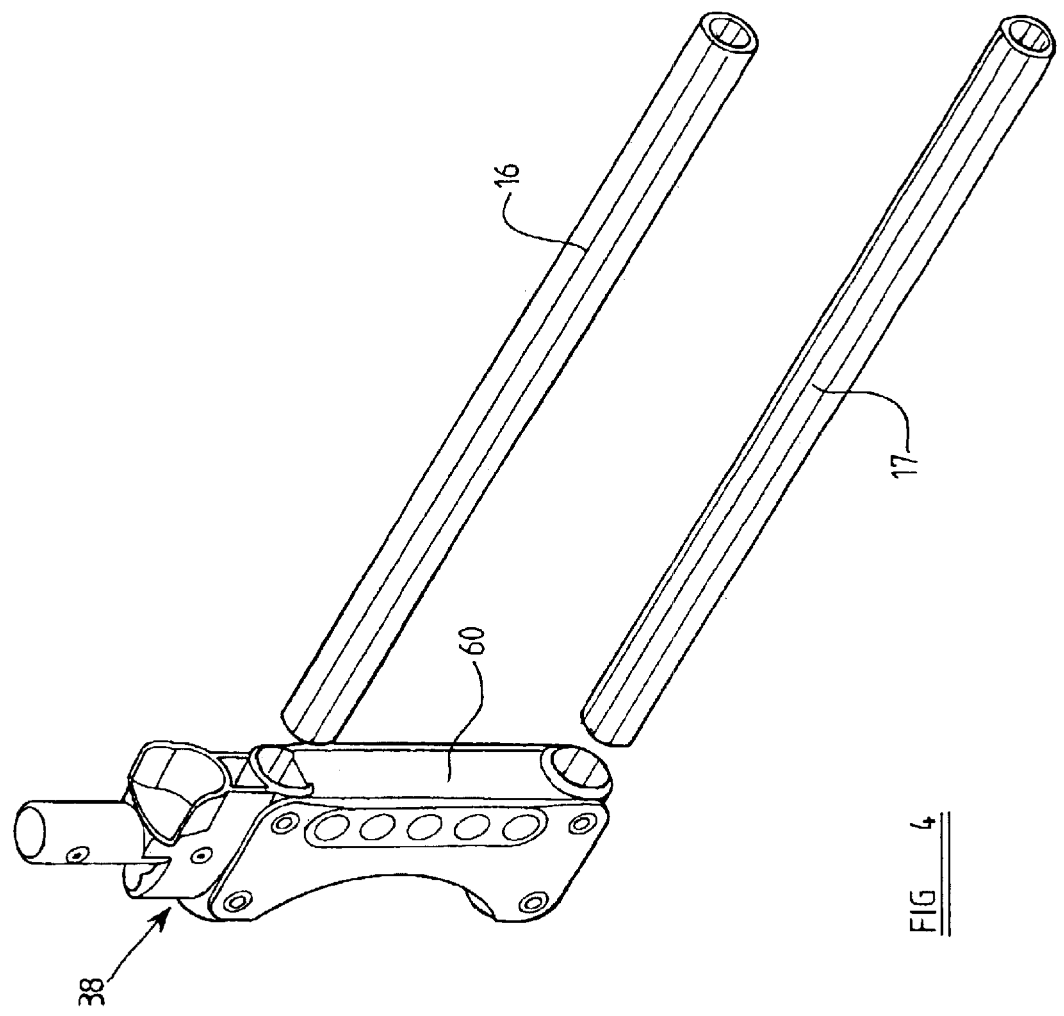
FIG. 4 is an exploded perspective view of a further part of the side frame structure of FIG. 2.
Figure 5:
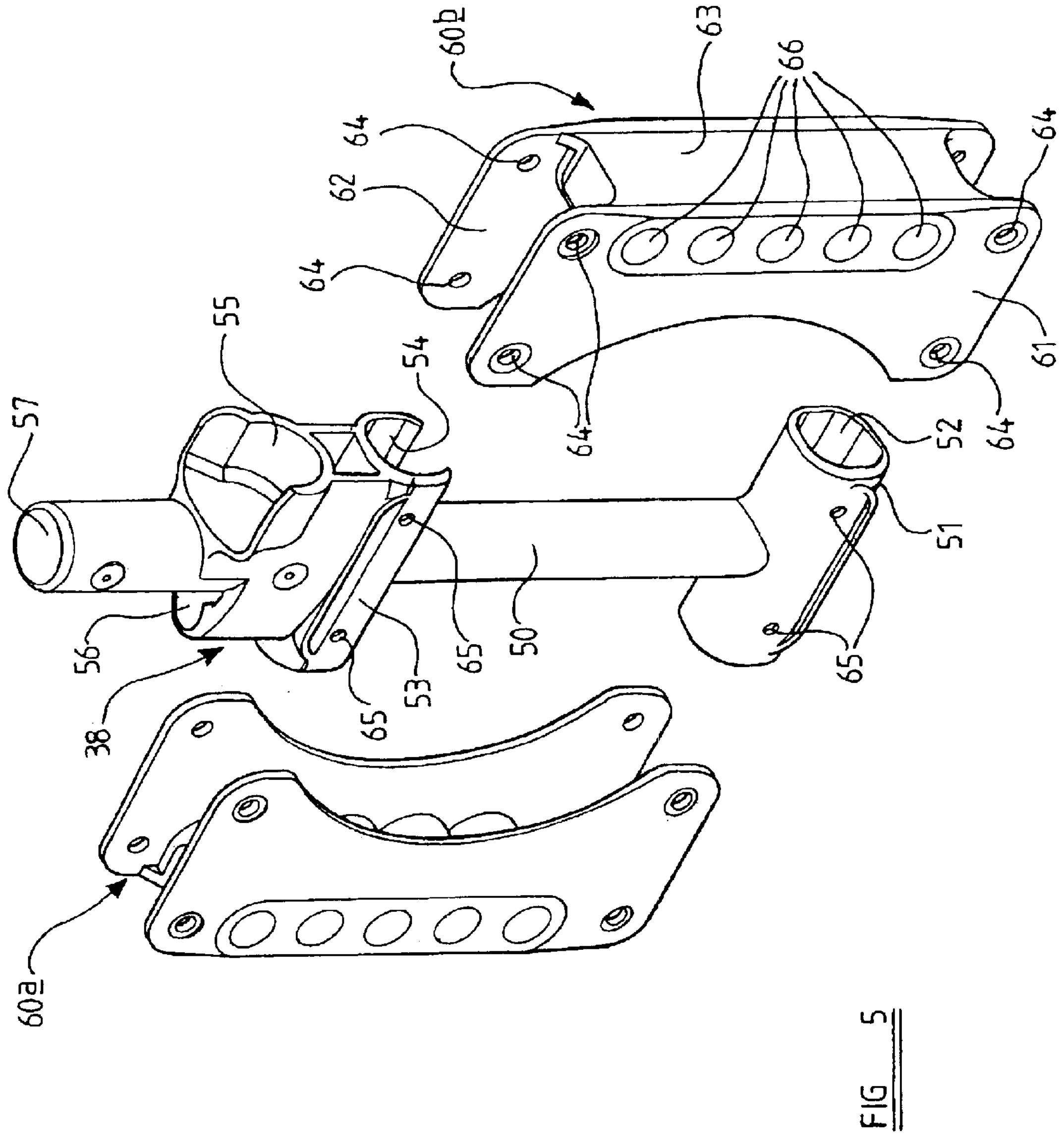
FIG. 5 is an exploded perspective view of yet a further part of the side frame structure of FIG. 2.

The configuration of the rear upright member 38 and the associated parts by which the rear wheel 13 is mounted thereto is seen most clearly with reference to FIGS. 4 and 5. The member 38, which is preferably a molding of a structural plastic material, comprises a tubular upright body 50, at the bottom of which and extending transversely of is a body portion 51 defining a through-extending receiving formation in the form of a socket 52 for receiving the lower rail member 17. The internal cross-sectional shape of the socket 52 corresponds to the external cross-sectional shape as above described of the lower rail member 17. Towards the top of the body 50, a body portion 53 defines a transverse through-extending receiving formation in the form of a socket 54 for receiving the upper rail member 16. The internal cross-sectional shape of the majority of the length of the socket 54 preferably corresponds to the external cross-sectional shape of the rail member 16, although at its ends, the socket 54 shown does not completely embrace the rail member 16. The body portion 53 further defines an opentopped supporting recess 55 for receiving an end of the seat-supporting member 87 described hereafter. The body portion 53 also defines an upwardly facing socket formation 56 and above the body portion 53 the body 50 continues to define a socket formation 57. The socket formations 56, 57 provide for attachment of other wheelchair parts, which may include handles, seat backrest structure, armrest structure, and so on (not shown).

An axle (not shown) on which a hub 59 (shown in FIG. 1) on rear wheel 13 is rotatably supported or carried by an axle-mounting member 60, which is secured to the rear upright member 38 in either of the two orientations 60*a* and 60*b*, which are depicted in FIG. 5. In FIG. 4, it is in its orientation 60*b*. The member 60 comprises two spaced parallel plate portions 61, 62 joined by a spacer block 63 and when secured to the member 38, the plates 61, 62 lie on respective opposite sides of the portions 51, 53 of the member 38. Fasteners, such as bolts (not shown), pass through aligned apertures, as indicated at 64, in the plate portions 61, 62 and, as indicated at 65, in the body portions 51, 53, and also pass through apertures (not shown) in the rail members 16, 17 therefore fastening the rail members 16, 17 as well as the axle-mounting member 60.

The axle (not shown) on which hub 59 of wheel 13 is rotatably supported is passed through and fixed in a selected one of a number of vertically spaced transversely extending apertures 66 in the wheel mounting member 60. Thus, the wheel 13 can be mounted at a selected one of a range of heights relative to the wheelchair, and in a relatively more forward or rearward disposition according to the orientation in which the axle-mounting member 63 is secured.

Figure 6:
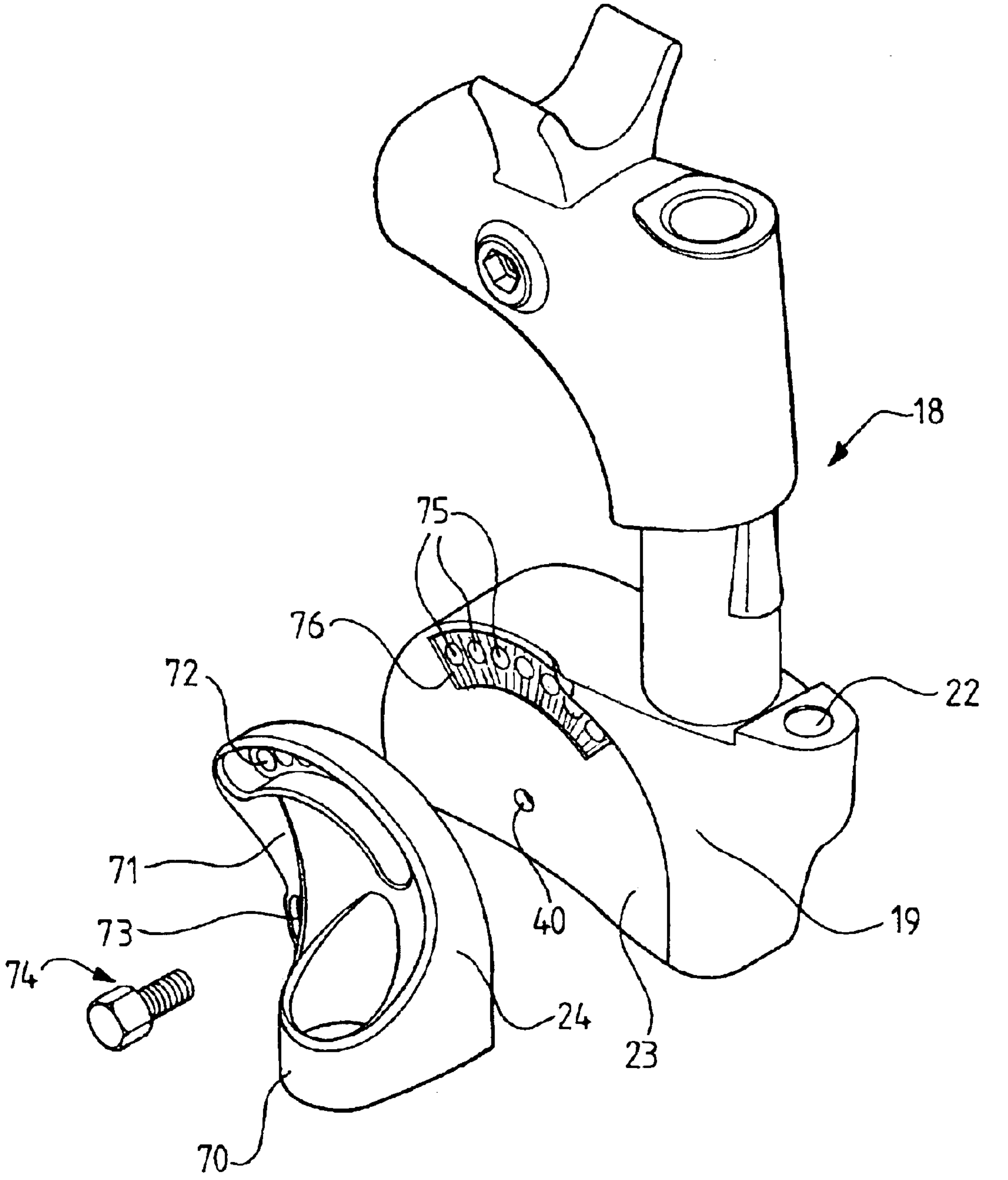
FIG. 6 is a perspective view showing the front wheel mounting of the wheelchair.

Referring now to FIG. 6 of the drawings, there is shown in greater detail the arrangement by which a front wheel 12 (shown in FIG. 2) is mounted on the wheelchair. The front wheel mounting bracket 24 has a lug portion 70 which carries, for pivotal movement about a castor swivel axis, the front wheel 12. The lug portion 70 extends from a somewhat sector shaped body part 71 with a flat surface facing the body portion 23. The body part 71 has a row of apertures 72 in arcuate disposition centered on an aperture 73 through which extends a fastener 74 by which the bracket 24 is secured to the body portion 23. The fastener 74 also passes through a transverse aperture 40 in the body portion 23. So, this fastener 74 also serves to secure the lower rail member 17 in the socket 25 in the body portion 23. Centered on the aperture 40 in the body portion 23 there is a row of apertures 75 in arcuate disposition. The apertures 75 are preferably uniformly spaced from one another but such spacing is preferably different from the spacing of the apertures 72 from one another. Over a similar length of arc there are illustrated seven of the apertures 75 and eight of the apertures 72.

The effect of the disposition of the apertures 72, 75 is that the inclination of the castor swivel axis of the front wheel 12 can be adjusted in small increments (e.g., 1.5°) by loosening the fastener 74, pivotally moving the support bracket 24, and passing a fastener (not shown) through whichever ones of apertures 72, 75 align with one another when the castor swivel axis inclination is as desired. Serrations 76 in the region of the apertures 75 co-operate with a protruding formation or formations in the region of the apertures 72 so that a set inclination will be held to some extent even before a fastener is passed through whichever apertures 72, 75 align with one another.

Referring again to FIG. 1 of the drawings, the cross-brace assembly 15 comprises first and second cross-brace members 80, 81 that are pivotally connected to one another between their ends by a pivot. Each cross-brace member 80, 81 is connected at one end (its lower end) to a respective side frame lower rail member 17 and at its other, upper end carries a seat-supporting member 84, 87. The cross-brace member 80 preferably comprises a metal tubular portion 82, which at one end is connected to a molded plastic pivot member 83 pivotable about the lower rail member 17, extending through a part of the pivot member 83 which is of cylindrical internal cross-section. The opposite end of the tubular part 82 is connected to seat-supporting member 84 described in greater detail hereafter. Similarly, the cross-brace member 81 preferably comprises a metal tubular portion 85 connected to a molded plastic pivot member 86, pivotable about the lower rail member 17 of the opposite side frame structure 11, and to a seat-supporting member 87. The two cross-brace members 80, 81 are pivotally connected to one another by a pivot pin or bolt (not shown) passed through apertures, as indicated at 88, in their tubular portions 82, 85. Finally, the cross-brace assembly 15 comprises respective links 89, 90 which are pivotally connected to the respective cross-brace members 80, 81 in the region of the seat-supporting members 84, 87, and further are pivotable about the respective upper rail members 16 of the side frame structures 10, 11. This arrangement of cross-brace assembly 15 permits the wheelchair to be folded or collapsed from its operative condition, as shown in FIG. 1 of the drawings, to a condition in which the two side frame structures 10, 11 of the wheelchair are disposed more closely together so that the wheelchair occupies less space. It will be noted that, in the operative condition, opposite ends of the seat-supporting members 84, 87 are received in the saddle formations, at 26 in FIG. 3, and recesses, at 55 in FIG. 5, of the upright members 18, 38 of the side frame structures 10, 11 of the wheelchair.

The cross-sectional shape of the tubular metal portions 82, 85 of the cross-brace members is preferably the same as that of the rail members as 16, 17 of the side frame structures 10, 11 of the wheelchair (although the size may be different), and fits in receiving formations of corresponding internal cross-section in the molded plastic pivot members 83, 86 and the seat-supporting members 84, 87 so that a firm connection is achieved therebetween. The pivot members 83, 86 engage the arcuate surface portions 30 to 33 of the lower rail members 17 of the respective side frame structures 10, 11, and the links 89, 90 co-operate with the arcuate surface portions of the upper rail members 16 of the respective side frame structures 10, 11 for pivotal movement thereabout. Thus, it will be appreciated that a common cross-section of metal tube is utilized which provides both for a rigid connection where required between the metal tube and molded plastic components, such as the front and rear upright members 18, 38 of the side frame structures 10, 11 and the pivot members 83, 86 and seat-supporting members 84, 87 of the cross-brace assembly 15, and also provides for pivoting about the tubes where required.

Figure 7:
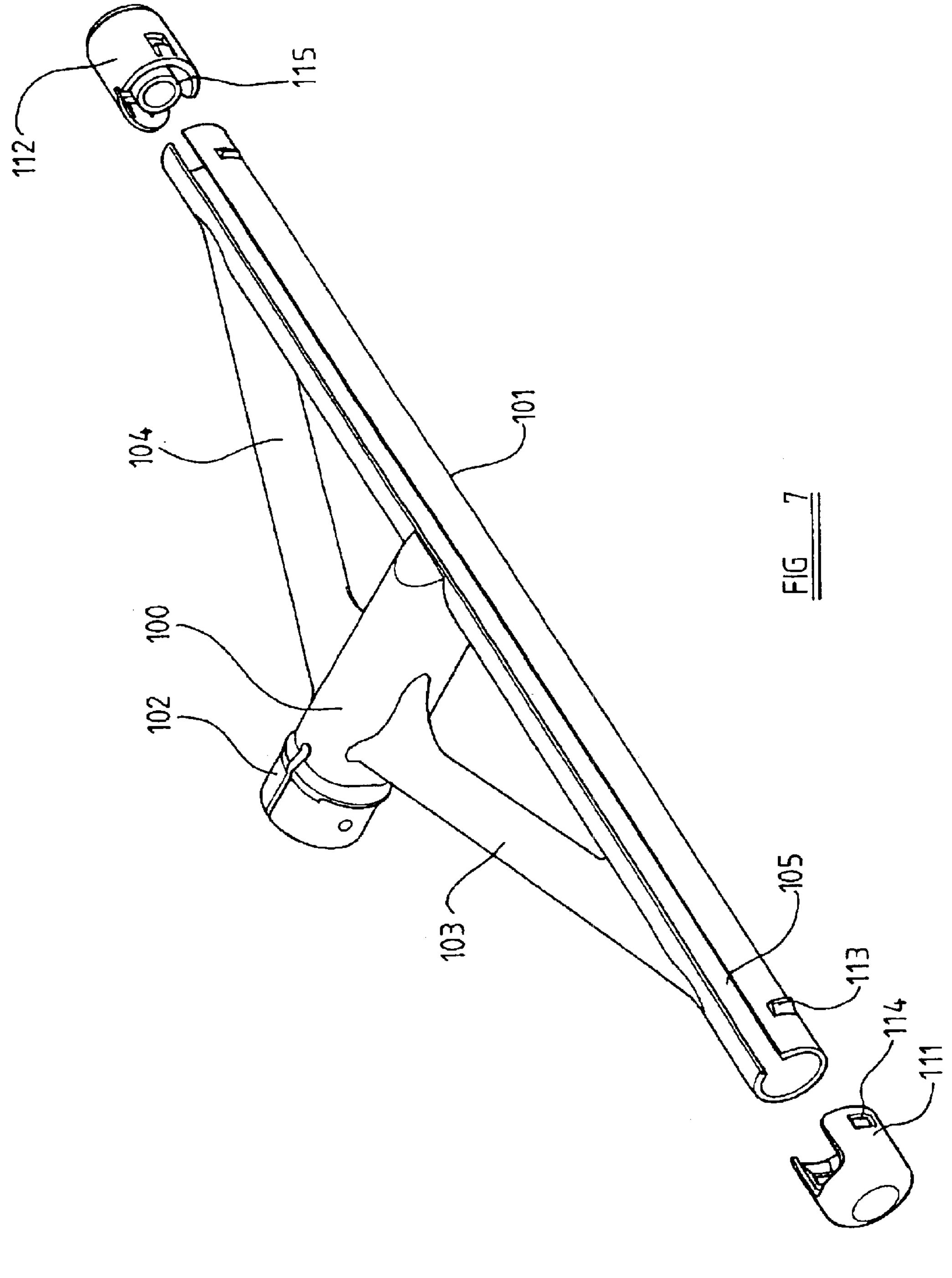
FIG. 7 is an exploded perspective view of a seat-supporting member of the wheelchair.
Figure 8:
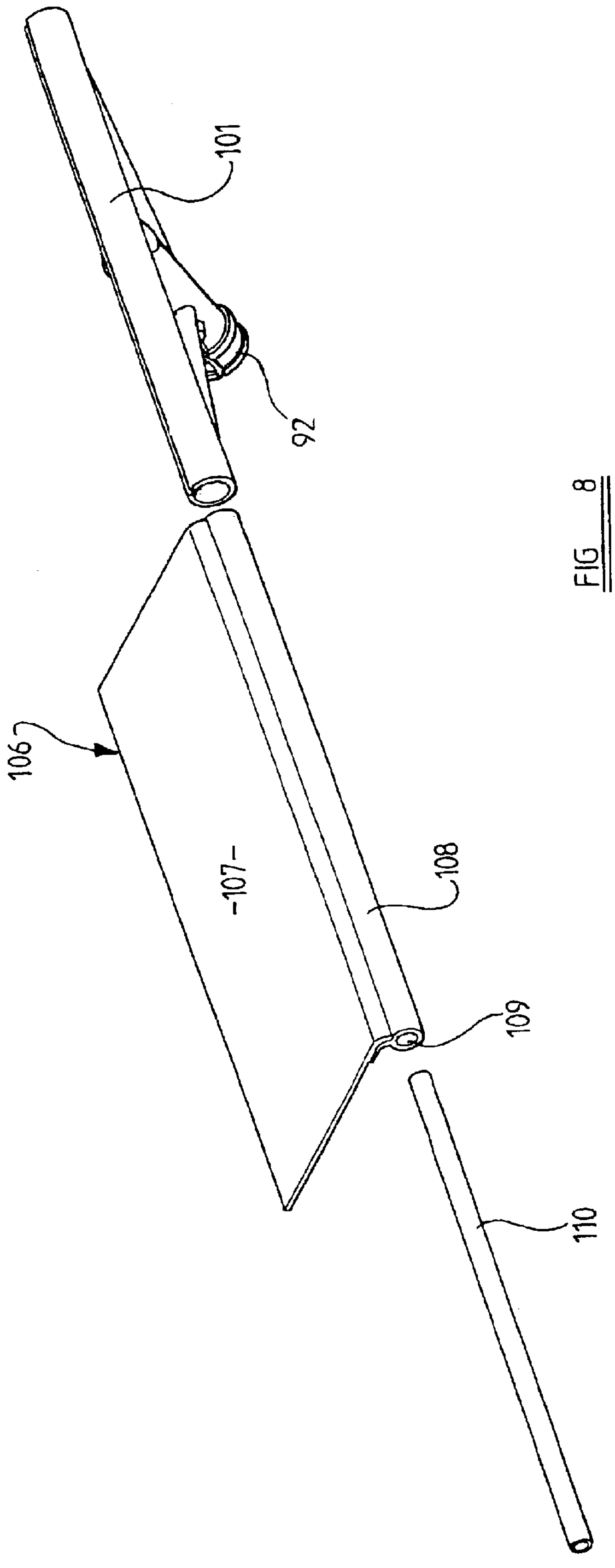
FIG. 8 is an exploded perspective view illustrating part of the wheelchair's seat in relation to the member of FIG. 7.

Referring now to FIGS. 7 and 8 of the drawings, which show in further detail a seat-supporting member 84 or 87. The member 84, 87, which is a molding of a suitable plastic material, comprises a body portion 100 and, extending transversely of the body portion 100 at an end thereof, a seat-supporting portion 101. At the opposite end of the body portion 100, a receiving formation extends into the body portion 100 in the direction of the longitudinal axis thereof. Such a receiving formation or socket is preferably in the form of a cross-sectional shape for receiving the tubular portion 82, 85 of the cross-brace member 15. The end of the body portion 100 into which the receiving formation extends is formed as a split clamping portion 102 to be embraced by a clamp 92 (shown in FIG. 8) and tightened to grip the tubular portion 82, 85 of the cross-brace member 15 when received therein. Adjacent the portion 102, two bracing web structures 103, 104 extend obliquely to regions near the opposite ends of the seat-supporting portion 101.

The seat-supporting portion 101 is hollow and cylindrical in configuration, with a longitudinal slot 105 preferably extending throughout its full length. This enables the seat-supporting portion 101 to co-operate with one side of a seat assembly 106 (shown in FIG. 8), which is preferably a panel of a suitable strong and flexible fabric at whose edge 108 it is folded back upon itself and stitched or otherwise secured to afford a tubular boundary portion 109 to receive a metal supporting rod or tube 110. With the rod 110 inserted into the tubular boundary portion 109 of the seat assembly 106, the edge 108 can be inserted endwise into the seat-supporting portion 101 with the fabric panel emerging from the slot 105. Thus, the fabric panel constituting the seat assembly 106 is firmly secured to the seat-supporting portion 101 since the edge 106 thereof containing the supporting rod 110 cannot be pulled through the slot 105. The dimensions of the rod 110 are such that with the seat fabric therearound the rod 110 is a close fit within the interior of portion 101, so that, although the seat-supporting portion 101 is of molded plastic material, the seat-supporting portion 101 is braced and rendered substantially rigid by the rod 110 when the seat assembly 106 is fitted. To prevent the seat assembly 106 from being removed endwise from the portion 101 of the seat-supporting portion 101, end caps 111, 112 are snap fitted to the ends of the portion 101. Protruding tabs, as indicated at 113, are shown on the ends of the portion 101, engaging in openings, as indicated at 114, on a part of the end cap 111, 112 embracing the end of the portion 101. In end cap 112, there is shown a circular boss portion 115 which fits inside the end region of the portion 101. The length of the seat assembly 106 may be less than the length of the portion 101, and the seat assembly 106 appropriately positioned in the direction of the length of the portion 101 (i.e., forward and rearward of the wheelchair) by selection of end caps 111, 112 having bosses 115 of suitable length.

Figure 9:
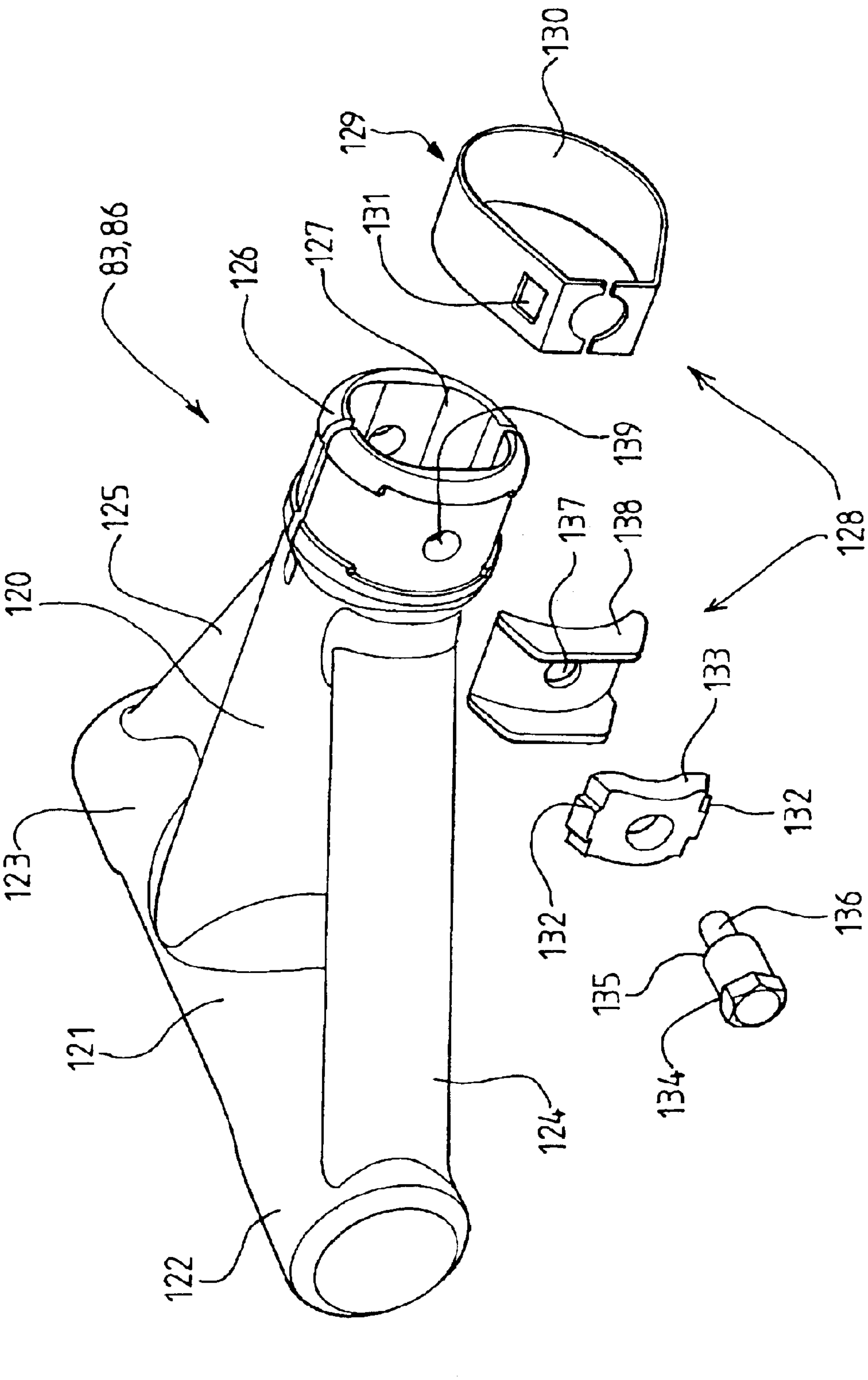
FIG. 9 is an exploded perspective view of part of the cross-brace assembly of the wheelchair.

Referring finally now to FIG. 9 of the drawings, there is shown one of the pivot members 83 or 86 by which one of the cross-brace members 80, 81 is pivotally connected to one of the lower rail members 17 of the wheelchair. This comprises a body portion 120 and a transversely extending portion 121 at whose ends there are aligned hollow cylindrical portions 122, 123 within which a through-extending lower rail member 17 (shown in FIG. 1) is supported for relative pivoting movement. Bracing web structures 124, 125 extend from the portions 122, 123 to the region of the body portion 120 remote from the portion 121.

As for the seat-supporting members 84, 87, the end of the body portion 120 remote from the portion 121 is formed as a split clamping portion 126 within which there is a receiving formation 127 of cross sectional shape corresponding to the tubular portion 82 or 85 of the cross-brace member 15. A clamping device, as indicated at 128, engaging the exterior of the clamping portion 126 is shown in its separate components. The clamping device 128 comprises a metal band 129 whose main part 130 is part circular in configuration to embrace, for example, approximately two thirds of the external circumference of the portion 126, and whose free ends approach one another and have apertures 131 in which are engaged lugs 132 on an abutment member 133. A clamping screw 134 is in screw-threaded engagement with the abutment member 133 and has a shoulder 135 followed by a nose portion 136 which passes through an aperture 137 in a pressure member 138 interposed between the abutment member 133 and the clamping portion 126 and shaped to cooperate with the part-circular external contour of the clamping portion 126. The nose portion 136 further extends through aperture 139 in portion 126 and into an appropriately positioned aperture (not shown) in the tube member received therein. The nose portion 136 thus acts as a locating element providing correct positioning of the pivot member 83, 86 relative to the tubular portion 82, 85 of the cross-brace member 80, 81, and additional security of the connection beyond the clamping of the tubular portion 82, 85 within the clamp portion 126 when the clamping screw 134 is tightened.

Stepwise adjustment of the length of each of the cross-brace members 80, 81 is achieved by providing the tubular portion 82, 85 of each cross-brace member 80, 81 with a number of apertures (not shown) for engagement by fasteners as 134, where each tubular portion 82, 85 is connected to the respective pivot member 83, 86 and/or seat-supporting member 84, 87. Such adjustment enables the width of the wheelchair to be altered, within the limits imposed by the overall sizes of the component parts.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle frame assembly comprising:

an elongate member having an external cross-sectional shape which is substantially square having corners replaced by circumferentially spaced circular portions of a circumscribing circle with flat portions therebetween which lie within the circle;

a receiving member having a receiving formation having an internal cross-sectional shape which cooperates at least with the flat portions of the external cross-sectional shape of the elongate member, to prevent relative movement between the receiving member and elongate member about a longitudinal axis of the elongate member; and a fastener for fastening the members together, wherein the fastener extends transversely through the receiving formation and the elongate member.

2. An assembly according to claim 1 wherein the external cross-sectional shape of the elongate member and internal cross-sectional shape of the receiving formation are substantially the same as one another.

3. An assembly according to claim 1, wherein the elongate member and the receiving member are frame components of a personal mobility vehicle.

4. A structural assembly comprising:

an elongate member having an external cross-sectional shape which is substantially square having corners replaced by circumferentially spaced circular portions of a circumscribing circle with flat portions therebetween which lie within the circle;

a receiving member having a receiving formation having an internal cross-sectional shape which cooperates at least with the flat portions of the external cross-sectional shape of the elongate member, to prevent relative movement between the receiving member and elongate member about a longitudinal axis of the elongate member; and a fastener for fastening the members together, wherein the fastener comprises a clamp embracing a part of the receiving member to clamp the elongate member in the receiving formation.

5. An assembly according to claim 4 further comprising a locating element engaging the receiving member and elongate member to position the receiving member and elongate member relative to one another.

6. An assembly according to claim 5 wherein the locating element is associated with the clamp and extends inwardly from the clamp through the receiving member to engage the elongate member.

7. An assembly according to claim 6 wherein the elongate member has a plurality of the formations for adjusting the position of the elongate member relative to the receiving member.

8. An assembly according to claim 4 wherein the clamp includes a locating element cooperating with respective formations in the elongate member and receiving member to position the elongate member in the direction of its length relative to the receiving member.

9. A structural assembly according to claim 8 wherein the formations comprise an aperture in the receiving member and an aperture or recess in the elongate member, the locating element extending radially inwardly through the aperture in the receiving member to engage the recess or aperture in the elongate member.

10. A structural assembly according to claim 9 wherein there is a row of the formations in the elongate member, spaced lengthwise thereof to permit adjustability in the position of the elongate member relative to the receiving member.

11. A structural assembly according to claim 10 wherein the locating element comprises a nose portion of a fastener by which the clamp is tightened.

12. An assembly according to claim 8, wherein the elongate member and the receiving member are frame components of a personal mobility vehicle.

13. A structural frame assembly comprising:

an elongate member having an external cross-sectional shape which is substantially square having corners replaced by circumferentially spaced circular portions of a circumscribing circle with flat portions therebetween which lie within the circle; and a receiving member having a receiving formation having an internal cross-sectional shape which cooperates at least with the flat portions of the external cross-sectional shape of the elongate member, to prevent relative movement between the receiving member and elongate member about a longitudinal axis of the elongate member; and a member angularly movable about the longitudinal axis of the elongate member and being received on the elongate member and engaging the circular portions of the elongate member.

14. A wheelchair comprising:

two side frame structures which carry wheels, each side frame structure including an upper rail member and a lower rail member extending forward and rearward of the wheelchair; and at least one structural assembly provided between one or more of the rail members for joining the rail members at front and/or rear of the wheelchair, the assembly comprising:

an elongate member having an external cross-sectional shape which is substantially square having corners replaced by circumferentially spaced circular portions of a circumscribing circle with flat portions therebetween which lie within the circle; and a receiving member having a receiving formation having an internal cross-sectional shape which cooperates at least with the flat portions of the external cross-sectional shape of the elongate member, to prevent relative movement between the receiving member and elongate member about a longitudinal axis of the elongate member.

15. A wheelchair according to claim 14 further comprising a cross-brace assembly including first and second cross-brace members pivotally connected to one another between ends thereof by a pivot, each of the cross-brace members being pivotally connected at a lower end with a respective one of the side frame lower rail members and being connected at an opposite upper end with a respective seat-supporting member, and respective links pivotally connected between the cross-brace members and a respective one of the upper rail members of the side frame structures, and wherein at least one of the assemblies is provided in each cross-brace member.

16. A wheelchair according to claim 14 further comprising:

a first cross-brace member pivotally connected to a second cross-brace member, the cross-brace members each comprising an elongate member;

at least one of a seat-supporting member or a pivot member comprising a receiving member having a receiving formation engaging; the elongate member of a respective one of the cross-brace members; and a clamp embracing the receiving member of the seat-supporting member to clamp the elongate member of the cross-brace member in the receiving formation of the receiving member of the seat-supporting member, wherein the clamp includes a locating element cooperating with respective formations in the elongate member of the cross-brace member and receiving member of the seat-supporting member to position the elongate member of the cross-brace member in the direction of its length relative to the receiving member of the seat-supporting member.

17. An assembly according to claim 16, wherein the elongate member and the receiving member are frame components of a personal mobility vehicle.

* * * * *